(12) United States Patent
Li (10) Patent No.: US 11,156,352 B1
(45) Date of Patent: Oct. 26, 2021

(54) PROJECTION LAMP HAVING LEDS, ROTATABLE MODIFIER, AND SPEAKER

(71) Applicant: Juwei Li, Guangdong (CN)

(72) Inventor: Juwei Li, Guangdong (CN)

( * ) Notice: Subject to any disclaimer, the term of this patent is extended or adjusted under 35 U.S.C. 154(b) by 0 days.

(21) Appl. No.: 17/165,610

(22) Filed: Feb. 2, 2021

(30) Foreign Application Priority Data

Dec. 9, 2020 (CN) .......................... 202022954757.8

(51) Int. Cl.
| | |
|---|---|
| F21V 14/08 | (2006.01) |
| F21V 33/00 | (2006.01) |
| F21S 10/00 | (2006.01) |
| F21V 23/00 | (2015.01) |
| F21S 9/02 | (2006.01) |
| F21V 7/22 | (2018.01) |
| F21V 23/04 | (2006.01) |
| F21V 3/04 | (2018.01) |
| H04R 1/02 | (2006.01) |
| H04R 3/00 | (2006.01) |
| G06F 3/16 | (2006.01) |
| F21V 17/12 | (2006.01) |
| F21Y 115/10 | (2016.01) |

(52) U.S. Cl.
CPC ............ *F21V 33/0056* (2013.01); *F21S 9/02* (2013.01); *F21S 10/007* (2013.01); *F21V 3/049* (2013.01); *F21V 7/22* (2013.01); *F21V 17/12* (2013.01); *F21V 23/007* (2013.01); *F21V 23/04* (2013.01); *G06F 3/165* (2013.01); *H04R 1/028* (2013.01); *H04R 3/00* (2013.01); *F21Y 2115/10* (2016.08)

(58) Field of Classification Search
CPC . F21V 1/10; F21V 14/06; F21V 14/08; F21V 14/085; F21K 9/65
USPC ................................. 362/231, 276, 383, 806
See application file for complete search history.

(56) References Cited

U.S. PATENT DOCUMENTS

| | | | | |
|---|---|---|---|---|
| 1,905,544 | A * | 4/1933 | Wittstein | G09F 19/18 40/581 |
| 2,867,716 | A * | 1/1959 | Ream | F21S 10/02 40/431 |
| 3,104,815 | A * | 9/1963 | Schultz | F21S 10/007 239/19 |
| 3,949,350 | A * | 4/1976 | Smith | F21S 6/002 362/86 |
| 4,858,079 | A * | 8/1989 | Ohashi | A63H 5/00 362/35 |
| 5,084,803 | A * | 1/1992 | Lan | A63H 33/22 362/275 |
| 5,394,309 | A * | 2/1995 | Brown | A01K 63/06 362/101 |
| 9,587,806 | B2 * | 3/2017 | Liu | F21V 21/0832 |
| 9,696,025 | B2 * | 7/2017 | Zhang | F21V 5/008 |
| 10,060,601 | B2 * | 8/2018 | Donnini | F21V 5/008 |

(Continued)

*Primary Examiner* — Ismael Negron (74) *Attorney, Agent, or Firm* — Muncy, Geissler, Olds & Lowe, P.C.

(57) ABSTRACT

A projection lamp includes a top cover, a patterned translucent member, a chassis, a rotating disc, a motor for rotating the disc, a diffusing light transmitting reflector, a first light-emitting diode provided above the diffusing light transmitting reflector, a second light-emitting diode provided below the diffusing light transmitting reflector, a speaker, a control board for controlling the light-emitting diodes and the motor, a battery, and a plastic bottom case configured to cooperate with the top cover to form a housing of the projection lamp.

7 Claims, 9 Drawing Sheets

(56) References Cited

U.S. PATENT DOCUMENTS

| | | | |
|---|---|---|---|
| 10,162,105 B2 * | 12/2018 | Jurik | F21V 5/048 |
| 2007/0097681 A1 * | 5/2007 | Chich | F21S 10/00 |
| | | | 362/232 |
| 2014/0254173 A1 * | 9/2014 | Jackson | F21S 6/002 |
| | | | 362/311.13 |

* cited by examiner

PROJECTION LAMP HAVING LEDS, ROTATABLE MODIFIER, AND SPEAKER

BACKGROUND OF THE INVENTION

1. Field of the Invention

The invention relates to lighting equipment technology, in particular to a projection lamp having LEDs, rotatable modifier, and speaker.

2. Description of the Related Art

In the prior art, when the user needs to buy a speaker, the speaker is complicated in wiring method, takes up space, and is very inconvenient to move or carry. If users want to use colorful and color-changing lights to adjust the atmosphere at home, they need to purchase some different kinds of colored lights, which is very inconvenient to install and use.

SUMMARY OF THE INVENTION

The technical problem to be solved by the invention is to provide a projection lamp having LEDs, rotatable modifier and speaker in view of the above problems.

In order to above the technical problems, the technical solutions provided by the invention are: a projection lamp, comprising a transparent top cover and a plastic bottom case cooperating to for a lamp housing; a translucent lenticular member provided below the top cover; a rotating chassis provided below and fixed to the lenticular member; a fixing disc provided below the rotating chassis and configured to support and enable rotation of the rotating chassis, and configured for attachment to the top cover and the bottom case; a motor provided below the fixing disc, the motor including rotating gears coupled to the rotating chassis to cause it to rotate when the motor is activated; a diffusing semi-transparent reflector provided below the fixing disc; a first light-emitting diode positioned below the lenticular member and above the semi-transparent reflector; a second light-emitting diode positioned below the semi-transparent reflector; a speaker provided in the bottom case; a main control board provided in the bottom case, the control board configured to control at least one of the first and second light emitting diodes, the motor, and the speaker; function bottoms provided on an outer surface of the plastic bottom case, the function buttons electrically connected to the main control board to provide a user input; and a battery provided in the bottom case, the battery electrically connected to the main control board to provide power to the projection lamp.

The first and second light-emitting diodes are positioned and installed by positioning posts and screw holes formed in the plastic bottom case.

As an improvement, the translucent lenticular member and the rotating chassis are fixed together by screws.

As an improvement, the fixing disc includes a sliding groove configured to contain lubricating oil, and the rotating chassis is arranged in the sliding groove.

As an improvement, an output shaft of the motor is provided with a pinion fixedly connected by a keyway and a key structure; the pinion and the rotating gear are meshed.

As an improvement, an output surface of the first light-emitting diode is engraved with a preset pattern by using a patterned imaging sheet.

As an improvement, the first light-emitting diode and the second light-emitting diode are superimposed on one another with the diffusing semi-transparent reflector therebetween.

As an improvement, a portion of the plastic bottom case facing the speaker is provided with honeycomb openings.

As an improvement, the battery is held in the positioning slot by a U-shaped fixing buckle and screws, and the battery is electrically connected to the main control board by a power cord.

BRIEF DESCRIPTION OF THE DRAWINGS

In the figures, 1 refers to the lamp cover; 2 refers to the pattern transparent cover; 3 refers to the rotating chassis; 4 refers to the fixing disc; 5 refers to the motor; 6 refers to the first light-emitting diode; 7 refers to the uneven light transmitting mirror; 8 refers to the second light-emitting diode; 9 refers to the speaker; 10 refers to the main control board; 11 refers to the battery; 12 refers to the plastic bottom case.

DETAILED DESCRIPTION OF THE PREFERRED EMBODIMENTS

The invention will be further described in detail hereinafter with reference to the drawings.

Figure 1:
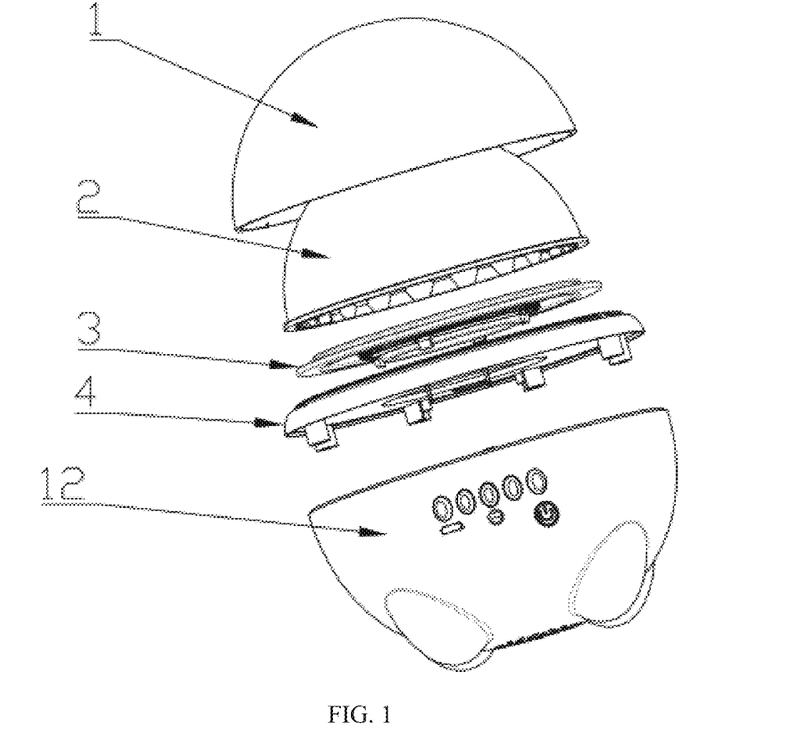
FIG. 1 is an exploded view of the case structure of the projection lamp having LEDs, rotatable modifier and speaker.
Figure 2:
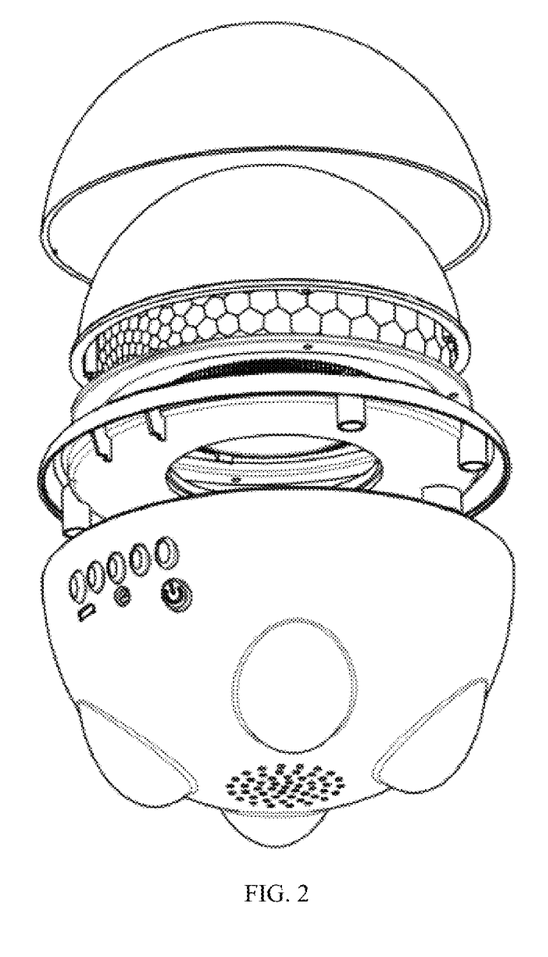
FIG. 2 is a supplementary perspective exploded view of the case structure of the projection lamp having LEDs, rotatable modifier and speaker.

When the invention is in specific implementation, a projection lamp having LEDs, rotatable modifier and speaker, comprising a lamp cover 1, a translucent lenticular member 2, a rotating chassis 3, a fixing disc 4, a motor 5, a first light-emitting diode 6, an uneven light transmitting mirror 7, a second light-emitting diode 8, a speaker 9, a main control board 10, a battery 11, and a plastic bottom case 12, wherein the exterior of the night light lamp is composed of the lamp cover 1 and the plastic bottom case 12, and the lamp cover 1 and the plastic bottom case 12 are connected and fixed by buckles on the rotating disk 4;

the translucent lenticular member 2 and the rotating chassis 3 are arranged between the lamp cover 1 and the rotating disk 4; the surface of the translucent lenticular member 2 is engraved with an imaging multi-diamond pattern; the rotating chassis 3 is integrated with a rotating gear, and the rotating gear and the rotating chassis 3 are a structure formed by one injection molding;

the fixing disc 4, the motor 5, the first light-emitting diode 6, the uneven light transmitting mirror 7, the second light-emitting diode 8, the speaker 9, the main control board 10, and the battery 11 are all arranged between the fixing disc 4 and the plastic bottom case 12; the motor 5 is arranged on one side of the main control board 10, and a control and power supply connection is provided between the motor 5 and the main control board 10; the first light-emitting diode 6 is arranged on one side of the motor 5, and the first light-emitting diode 6 is positioned and installed by positioning posts and screw holes injected in the plastic bottom case 12; a power supply connection is provided between the first light-emitting diode 6 and the main control board 10; the uneven light transmitting mirror 7 is arranged between the first light-emitting diode 6 and the second light-emitting diode 8, and the uneven light transmitting mirror 7 is fixed by a positioning bracket injected in the plastic bottom case 12; the second light-emitting diode 8 is arranged on one side of the uneven light transmitting mirror 7, and the second light-emitting diode 8 is positioned and installed by positioning posts and screw holes injected in the plastic bottom case 12; a power supply connection is provided between the second light-emitting diode 8 and the main control board 10; the speaker 9 is arranged in the bottom slot of the plastic bottom case 12, and a control and power supply connection is provided between the speaker 9 and the main control board 10; the main control board 10 is arranged in the inner wall slot of the plastic bottom case 12, and the outer side of the plastic bottom case 12 is provided with function buttons; a screen line connection is provided between the function buttons and the input end of the main control board 10 to form an input connection for control information; the battery 11 is arranged in a positioning slot on one side of the main control board 10, and the positioning slot is integrally molded with the plastic bottom case 12.

A number of screws are arranged between the translucent lenticular member 2 and the rotating chassis 3 for fixed connection.

The rotating chassis 3 is arranged in the sliding groove of the rotating disk 4, and lubricating oil is added to the sliding groove.

The output end of the motor 5 is provided with a gear, and the gear and the output end of the motor 5 are fixedly connected by a keyway and a key structure; the gear and the rotating gear in the rotating chassis 3 form a rotatable fit connection through meshing.

The surface of the light-emitting component of the first light-emitting diode 6 is provided with a patterned imaging sheet, and the first light-emitting diode 6 is engraved with a preset pattern.

Figure 5:
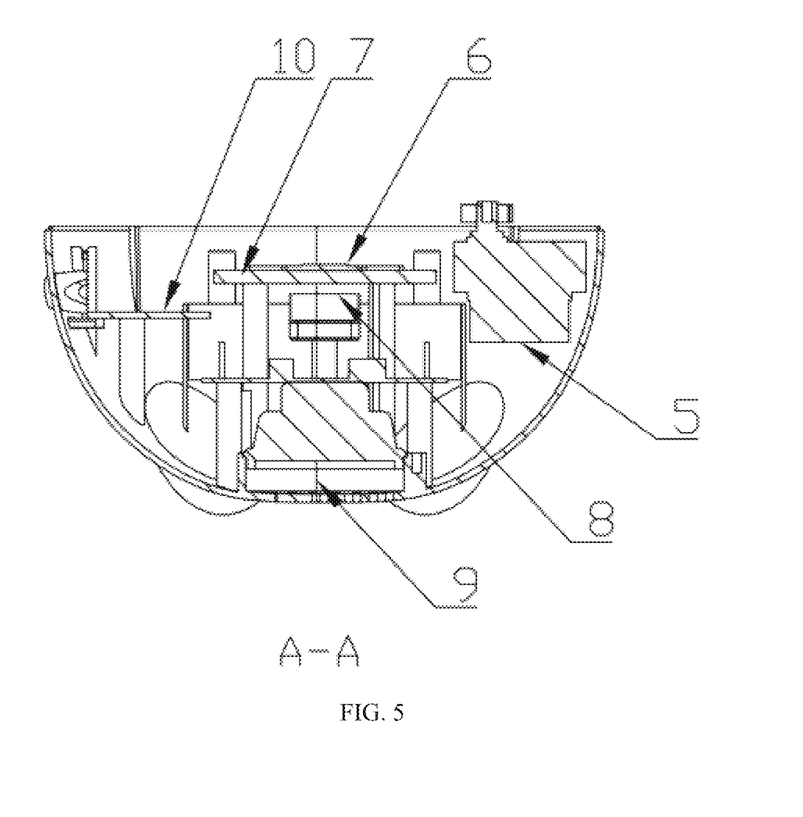
FIG. 5 is a schematic cross-sectional view of A-A in the projection lamp having LEDs, rotatable modifier and speaker.
Figure 6:
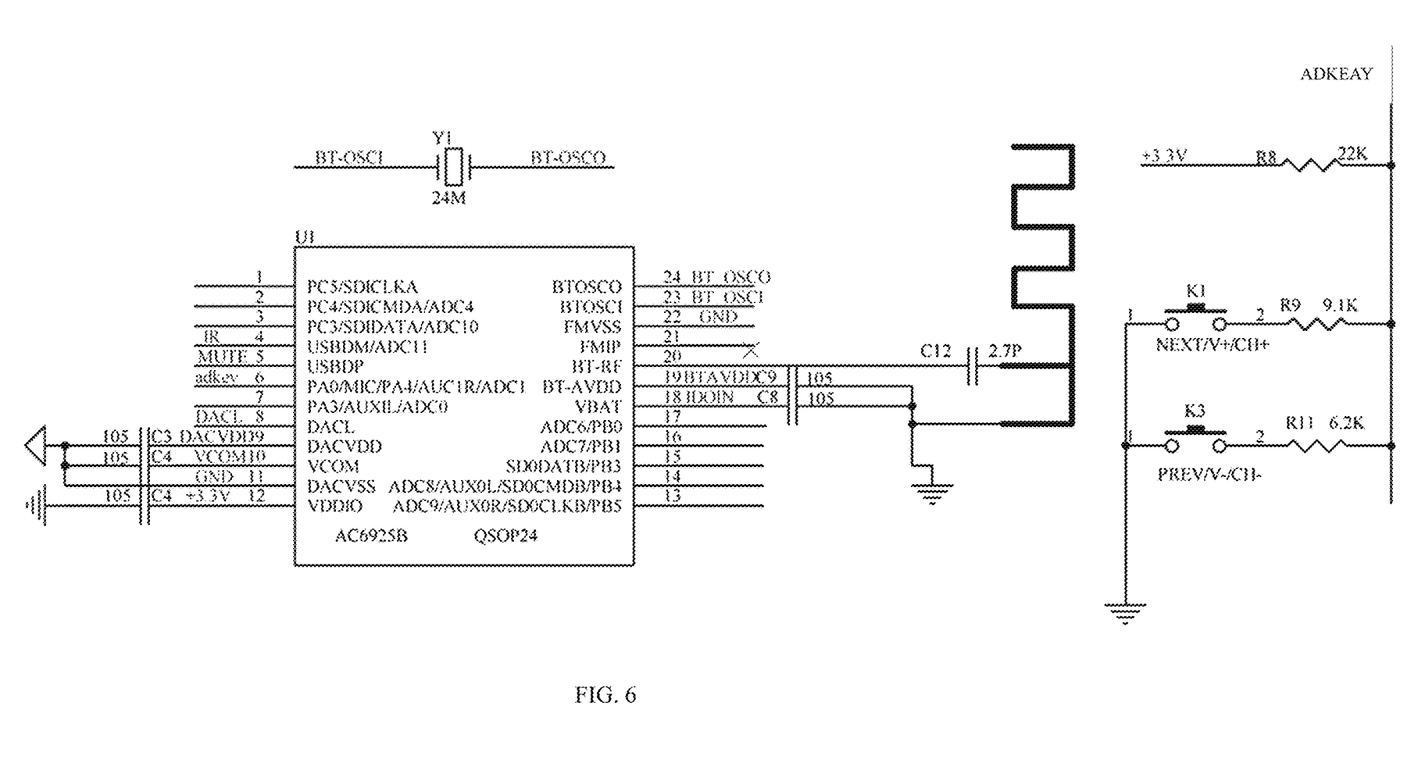
FIG. 6 is a circuit diagram of the MCU module and the integrated Bluetooth in the main control board.
Figure 7:
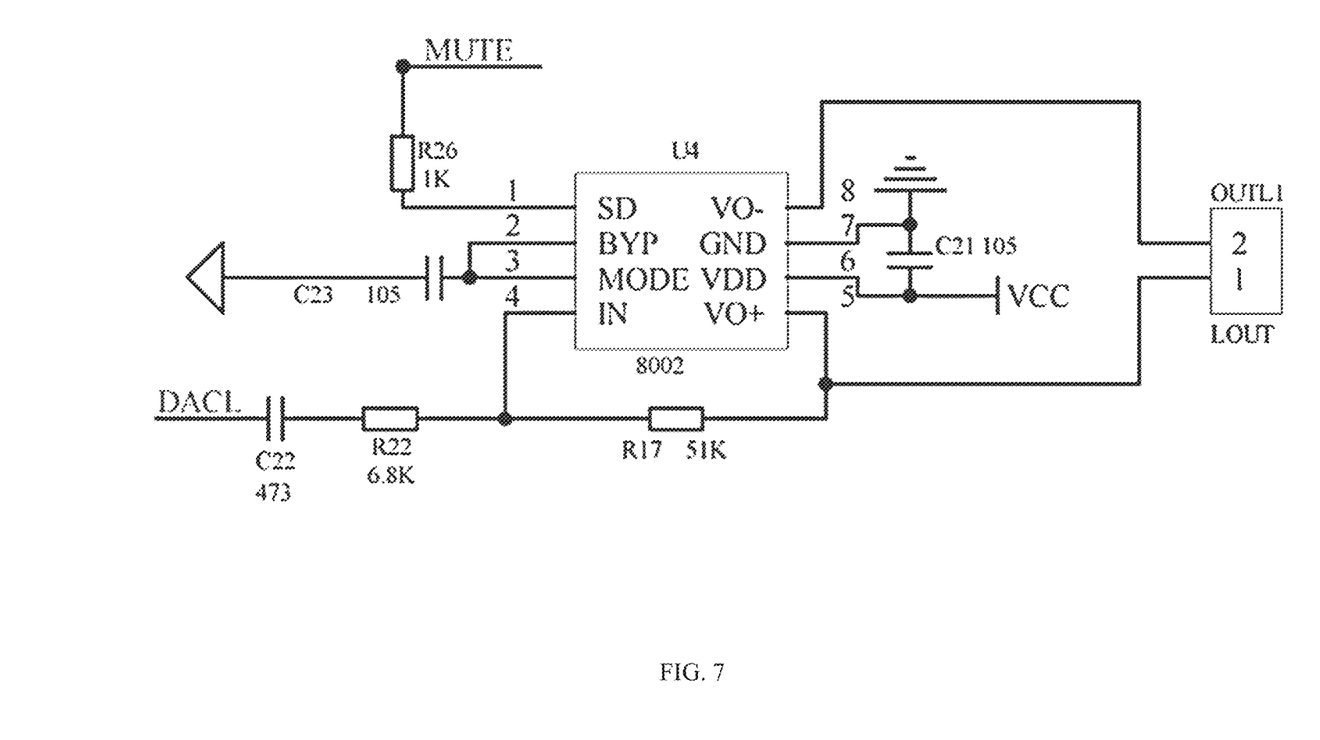
FIG. 7 is a schematic circuit diagram of the power amplifier circuit in the main control board.
Figure 8:
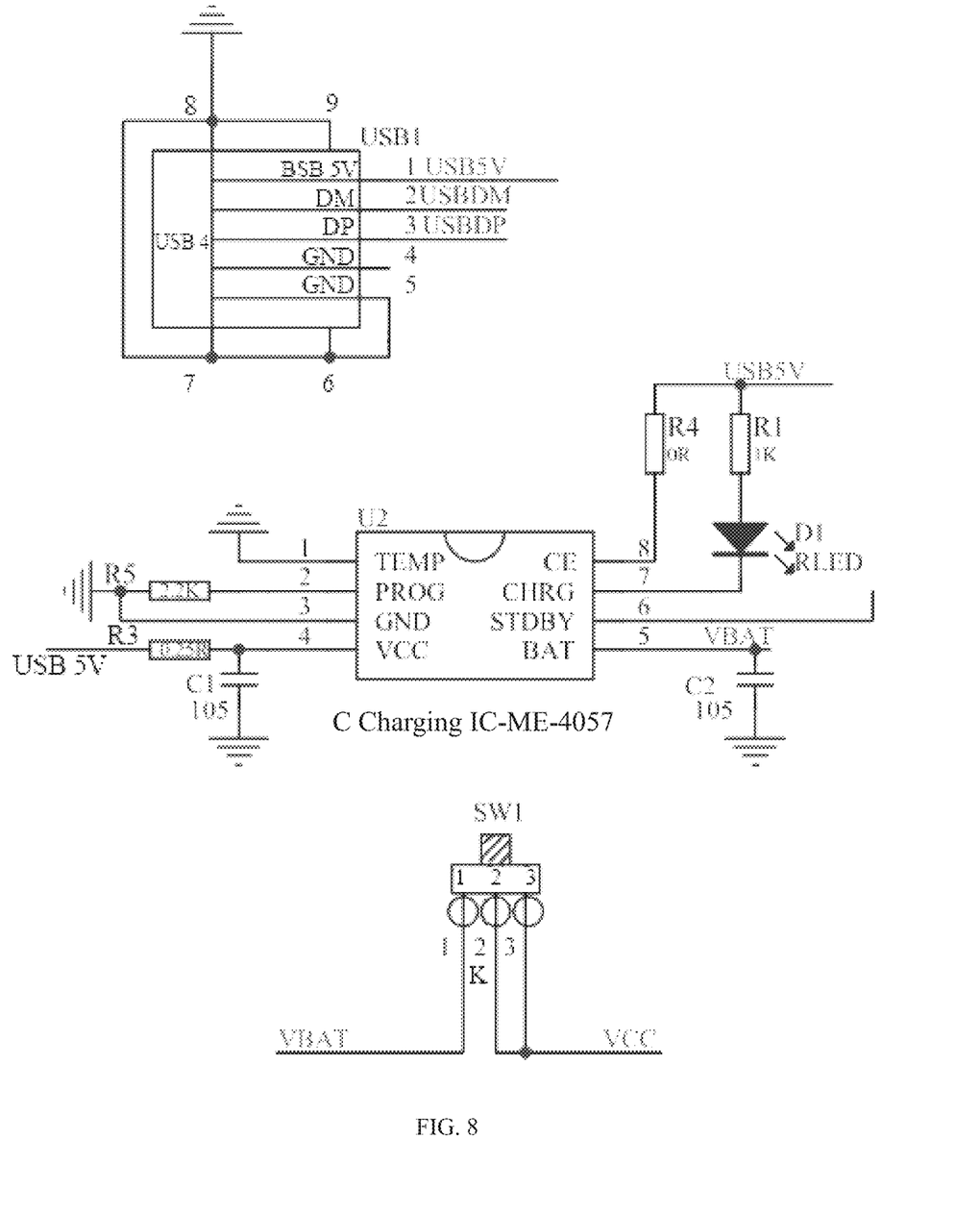
FIG. 8 is a schematic circuit diagram of the charging circuit in the main control board.
Figure 9:
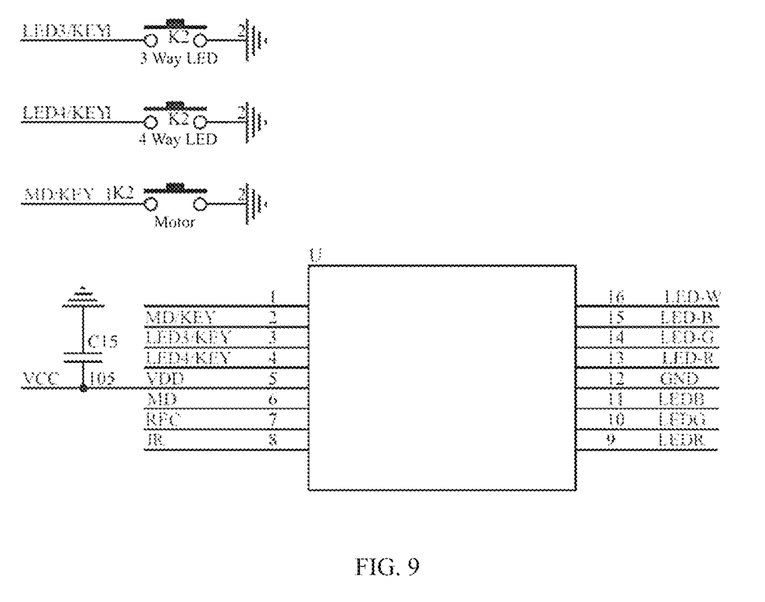
FIG. 9 is a schematic diagram of the lamp flickering control circuit in the main control board.
Figure 10:
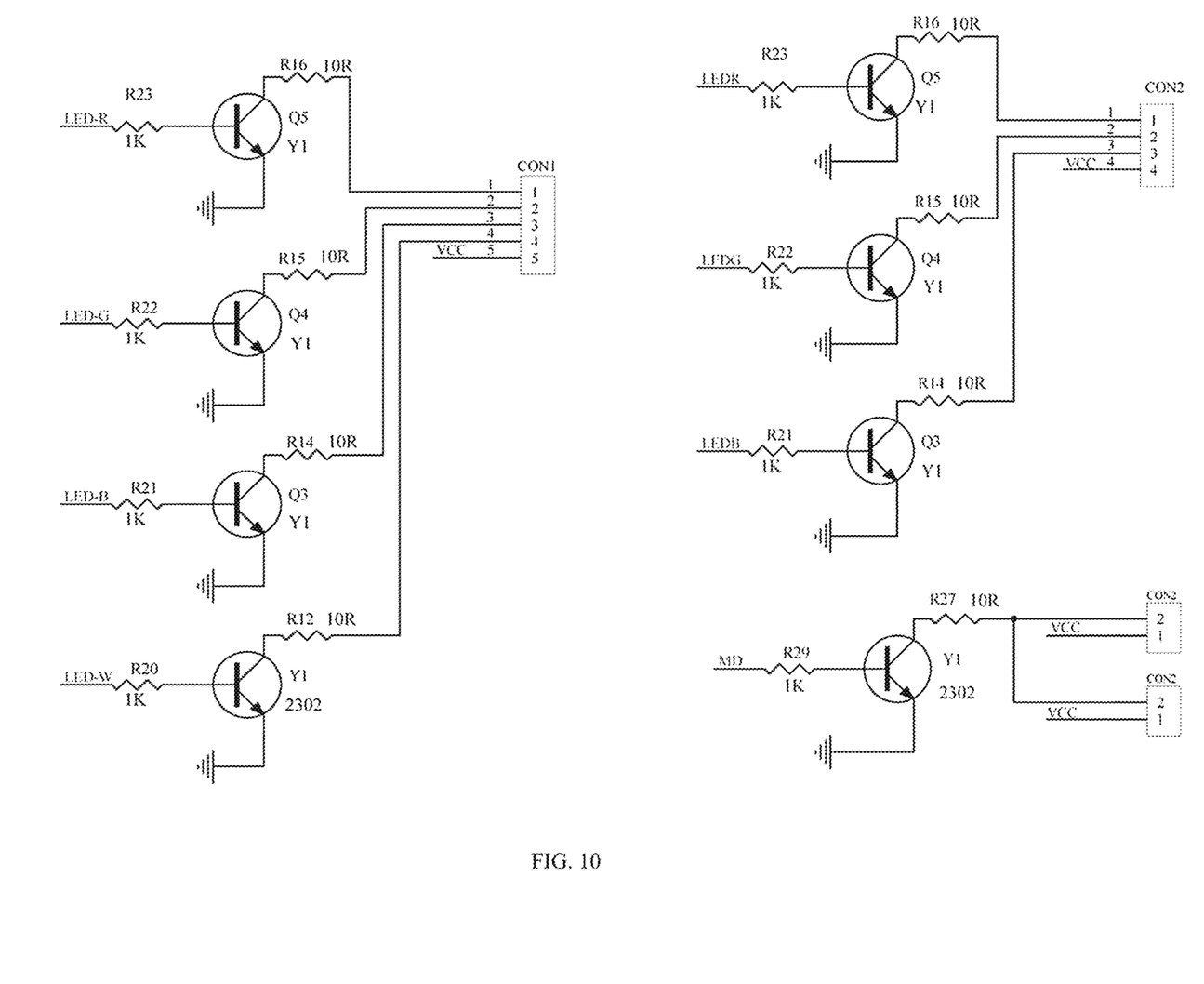
FIG. 10 is a schematic circuit diagram of the LED drive circuit in the main control board.

A superimposed sandwich structure is formed between the uneven light transmitting mirror 7 and the first light-emitting diode 6 and the second light-emitting diode 8.

Figure 3:
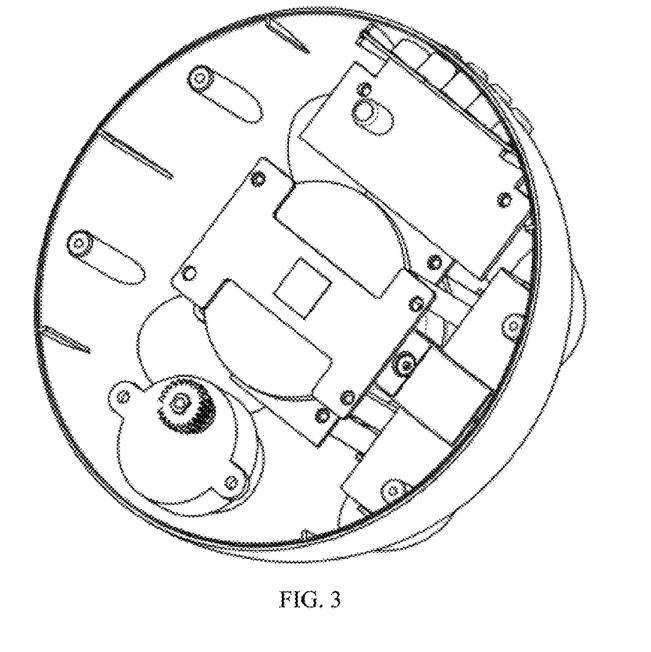
FIG. 3 is a perspective view of a part of the plastic bottom case of the projection lamp having LEDs, rotatable modifier and speaker.
Figure 4:
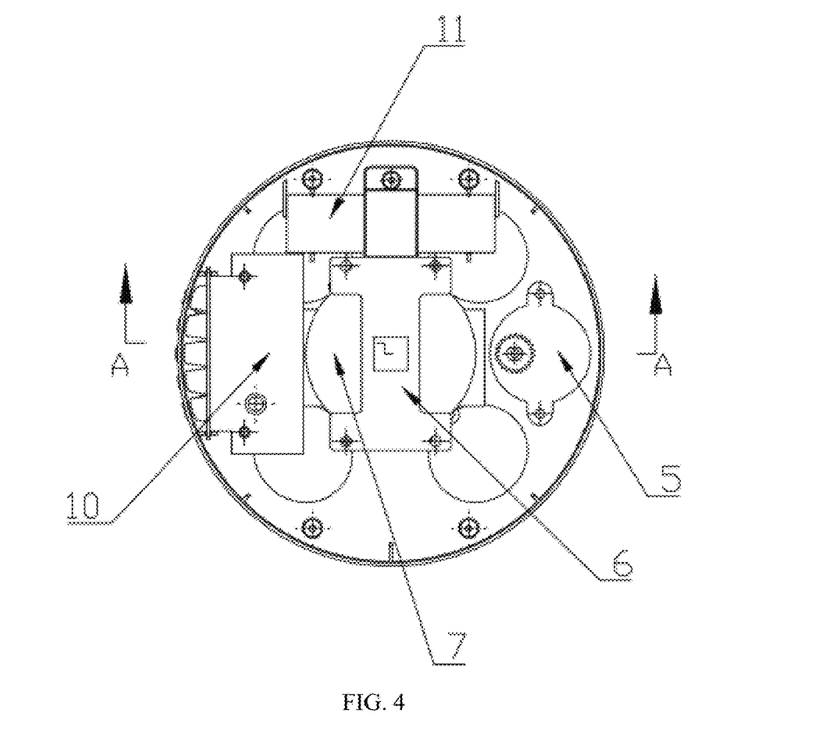
FIG. 4 is a top view of a part of the plastic bottom case of the projection lamp having LEDs, rotatable modifier and speaker.

The part of the plastic bottom case 12 corresponding to the sound generation direction of the speaker 9 is provided with honeycomb openings.

The battery 11 is fixed in the positioning slot by a U-shaped fixing buckle and screws, and a power cord connection is provided between the battery 11 and the main control board 10 to form a power supply connection loop.

The working principle of the invention: the night light lamp of the invention supports the mixing of light and music. At the same time, it can illuminate the water pattern or cloud-like image through the first light-emitting diode, the uneven light transmitting mirror, the second light-emitting diode and the translucent lenticular member. The main control board controls the motor to drive the rotating gear, thereby driving the translucent lenticular member to rotate.

At the same time, the main control board adopts the design of MCU as the center, and the main control board integrates the MCU module, the Bluetooth circuit, the power amplifier circuit, the charging circuit, the lamp flickering control circuit and the LED drive circuit through the PCB integration. When the night light lamp is turned on, the MCU simultaneously drives the music playback and the motor operation through the power amplifier circuit, the lamp flickering control circuit, and the LED drive circuit, so that the pattern on the translucent lenticular member of the night light lamp rotates, which creates a dynamic visual and auditory effect.

In the invention, unless otherwise clearly defined and limited, the terms "installed", "connected", "fixed" and other terms should be interpreted broadly; for example, it can be a fixed connection, it can be a detachable connection, or integrated; it can be a mechanical connection or an electrical connection; it can be a direct connection, or an indirectly connection through an intermediate medium, and it can be an internal communication between two elements or the interaction relationship between two elements, unless specifically defined otherwise. For those of ordinary skill in the art, the specific meaning of the above terms in the invention can be understood according to specific circumstances.

The above are only preferred embodiments of the invention, and do not limit the implementation and protection scope of the invention. Those skilled in the art should be able to realize that all equivalent replacements and obvious modifications made by using the contents of the description and illustrations of the invention should be included in the protection scope of the invention.

The invention claimed is:
1. A projection lamp comprising:
    a transparent top cover and a plastic bottom case cooperating to form a lamp housing;
    a translucent lenticular member provided below the top cover;
    a rotating chassis provided below and fixed to the lenticular member;
    a fixing disc provided below the rotating chassis and configured to support and enable rotation of the rotating chassis, and configured for attachment to the top cover and the bottom case;
    a motor provided below the fixing disc, the motor including rotating gears coupled to the rotating chassis to cause it to rotate when the motor is activated;
    a diffusing semi-transparent reflector provided below the fixing disc;
    a first light-emitting diode positioned below the lenticular member and above the semi-transparent reflector;
    a second light-emitting diode positioned below the semi-transparent reflector;
    a speaker provided in the bottom case;
    a main control board provided in the bottom case, the control board configured to control at least one of the first and second light emitting diodes, the motor, and the speaker;
    function buttons provided on an outer surface of the plastic bottom case, the function buttons electrically connected to the main control board to provide a user input; and a battery provided in the bottom case, the battery electrically connected to the main control board to provide power to the projection lamp, wherein the first and second light-emitting diodes are positioned and installed by positioning posts and screw holes formed in the plastic bottom case.

2. The projection lamp according to claim 1, wherein the translucent lenticular member and the rotating chassis are fixed together.

3. The projection lamp according to claim 1, wherein an output shaft of the motor is provided with a pinion; the pinion and the rotating gear are meshed.

4. The projection lamp according to claim 1, wherein an output surface of the first light-emitting diode is engraved with a preset pattern.

5. The projection lamp according to claim 1, wherein the first light-emitting diode and the second light-emitting diode are superimposed on one another with the diffusing semi-transparent reflector therebetween.

6. The projection lamp according to claim 1, wherein a portion of the plastic bottom case facing the speaker is provided with openings.

7. The projection lamp according to claim 1, wherein the battery is electrically connected to the main control board by a power cord.

\* \* \* \* \*